United States Patent [19]

Kunz

[11] Patent Number: 4,681,478

[45] Date of Patent: Jul. 21, 1987

[54] COUPLING FOR ROTATABLY CONNECTING A REEL WITH A DRIVE SHAFT

[75] Inventor: Peter Kunz, Lörrach-Hauingen, Fed. Rep. of Germany

[73] Assignee: Ludwig Boschert GmbH & Co. KG, Lörrach-Hauingen, Fed. Rep. of Germany

[21] Appl. No.: 839,727

[22] Filed: Mar. 14, 1986

[30] Foreign Application Priority Data

Mar. 14, 1985 [DE] Fed. Rep. of Germany ....... 3509108

[51] Int. Cl.$^4$ ................................................ F16D 1/00
[52] U.S. Cl. .................................... 403/341; 403/316; 242/68.4
[58] Field of Search ................. 403/341, 316, 317, 26; 242/68.4, 68.1

[56] References Cited

U.S. PATENT DOCUMENTS

| 3,246,858 | 4/1966 | Alexeff | 242/68.4 |
| 3,480,225 | 11/1969 | Alexeff | 242/68.4 |
| 4,551,117 | 11/1985 | Kunz | 464/106 |

FOREIGN PATENT DOCUMENTS 917592 9/1954 Fed. Rep. of Germany.
3127553 11/1983 Fed. Rep. of Germany.

*Primary Examiner*—Andrew V. Kundrat
*Attorney, Agent, or Firm*—Peter K. Kontler

[57] ABSTRACT

A coupling for rotatably connecting a reel with a drive shaft has a support which is fast with the drive shaft. The support is provided with a recess which is designed to receive a complementary stub shaft fixed to the reel. The recess has an open side via which the stub shaft may be inserted in and removed from the recess, and an arresting element in the form of a wheel is provided to close the open side. The arresting wheel is pivotally mounted on the support for movement between a release position in which the open side of the recess is exposed to permit insertion of the stub shaft in, and removal of the latter from, the recess, and an arrest position in which the open side of the recess is closed to prevent release of the stub shaft. The pivot axis of the arresting wheel extends at right angles to the axis of rotation of the support. A pawl is pivotally mounted on the arresting wheel for movement between an operative and an inoperative position, and the pivot axis of the pawl is parallel to that of the arresting wheel. The pawl has a free end portion, and the support is provided with a cutout which receives this end portion when the arresting wheel is in its arrest position and the pawl is in its operative position. The pawl an the cutout are designed in such a manner that, in the operative position of the pawl, the latter prevents unintentional movement of the arresting wheel from its arrest position to its release position. The pawl has an arm which may be gripped in order to pivot the pawl to the inoperative position in which the pawl is clear of the cutout. The arresting wheel may then be moved to its release position.

30 Claims, 2 Drawing Figures

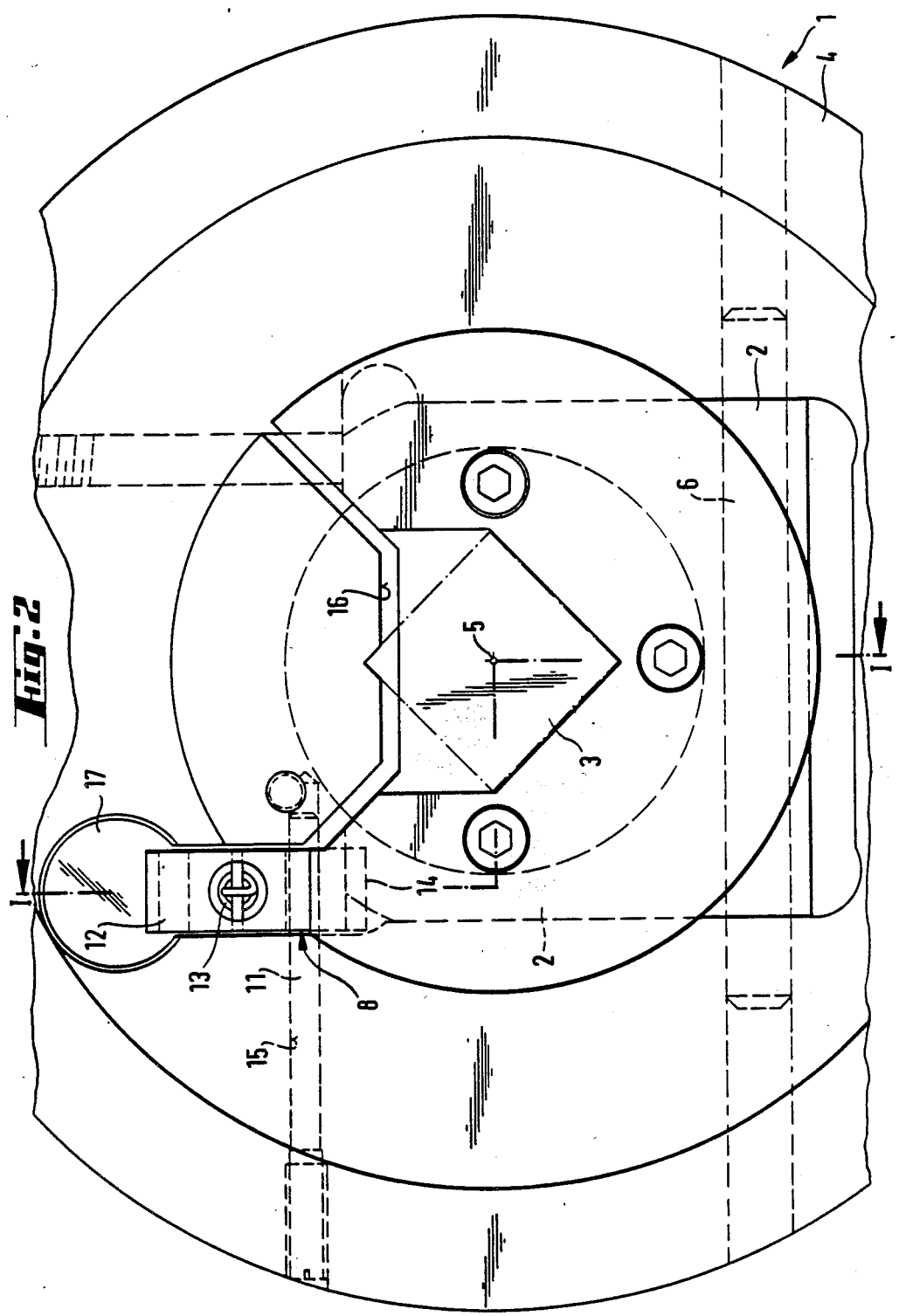

COUPLING FOR ROTATABLY CONNECTING A REEL WITH A DRIVE SHAFT

BACKGROUND OF THE INVENTION

The invention relates generally to a coupling.

More particularly, the invention relates to a coupling for rotatably connecting a pair of rotary members, e.g., a reel and a drive shaft for the reel.

A known coupling for rotatably connecting a pair of rotary members includes a support for holding the members against relative rotation. The support, which rotates with the members, is provided with a recess designed to receive a complementary portion of one of the members, e.g., a stub shaft of a reel for winding and unwinding lengths of material. An arresting element in the form of a wheel is rotatable with the support and is pivotable between a release position in which the recess is accessible for insertion or removal of a member, and an arrest position in which removal of a member from the recess is prevented. The pivot axis of the arresting wheel extends transverse to the axis of rotation of the support. A positioning element which bridges the support and the arresting wheel in the arrest position of the latter serves to locate the arresting wheel in the arrest position.

A coupling of this type without a positioning element is disclosed in the West German Pat. No. 917 592. This coupling is designed with abutments and openings which insure that, if the coupling begins to rotate while the arresting wheel is in the release position, the arresting wheel is automatically moved to the arrest position.

Another coupling of the above type is known from the West German Pat. No. 31 27 553. The coupling of the patent has a positioning element for locating the arresting wheel in the arrest position, and the positioning element is in the form of a ball which engages the support and the arresting wheel in such position.

A problem arises with conventional couplings when the member accommodated by the recess of the support is heavy and the coupling is rotated 90° from the position it occupies during insertion of the member into the recess. Under such circumstances, the weight of the member is transmitted to the arresting wheel and, if the portion of the member in the recess then undergoes deformation due to the weight of the member, the arresting wheel is biased to the release position. The arresting wheel may be unable to resist the forces acting upon it, even if the arresting wheel is located in the arrest position by means of a ball, and may accordingly pivot to the release position. The tendency of the arresting wheel to move to the release position is increased when the portion of the member in the recess has an edge in engagement with the arresting wheel. In such a situation, the forces exerted by the member are transmitted almost exclusively to the arresting wheel over an extended angle of rotation of the latter.

The positioning ball offers limited resistance to movement of the arresting wheel from the arrest position to the release position in order to allow intentional pivoting of the arresting wheel to the release position as easily as possible.

OBJECTS AND SUMMARY OF THE INVENTION

It is an object of the invention to provide a coupling which permits an arresting element to be readily moved to a release position intentionally but inhibits unintentional movement of the arresting element to the release position even under heavy loads.

Another object of the invention is to provide a coupling having relatively simple means capable of inhibiting unintentional movement of an arresting element to a release position but allowing the arresting element to be easily moved to the release position intentionally.

An additional object of the invention is to provide a coupling having relatively low cost means able to effectively resist unintentional movement of an arresting element to a release position but permitting intentional movement of the arresting element to the release position to be accomplished in a simple manner.

The preceding objects, as well as others which will become apparent as the description proceeds, are achieved by the invention.

The invention resides in a coupling for rotatably connecting a pair of rotary members. The coupling comprises a support designed to hold the members against relative rotation and to rotate with the latter. The support is provided with a recess designed to receive a complementary portion of one of the members, e.g., a stub shaft fast with one of the members. An arresting element, preferably in the form of a wheel, is rotatable with the support and is movable between a release position in which the complementary portion is insertable in and removable from the recess, and an arrest position in which removal of the complementary portion from the recess is inhibited. Locking means is provided for locking the arresting element against movement from the arrest position to the release position. The locking means includes a bar-like element movable between an inoperative position, and an operative position in which the bar-like element bridges the support and the arresting element to thereby lock the arresting element against movement from the arrest position to the release position.

The coupling of the invention is particularly well-suited for rotatably connecting a drive shaft with a spool or reel for winding and unwinding lengths of material. The reel may be provided with a laterally extending stub shaft which is receivable in the recess of the support.

The arresting element is preferably pivotable between the release and arrest positions about an axis transverse to the axis of rotation of the support.

According to a preferred embodiment of the invention, the bar-like element constitutes a pawl.

A pawl is capable of resisting large forces and, in its operative position, can thus prevent unintentional opening of the arresting element, i.e., unintentional movement of the arresting element to its release position, even under large loads. Furthermore, a pawl is a relatively simple structural element which can be accommodated in the region bridging the support and the arresting element without taking up much, or without taking up any, additional space. Moreover, a pawl can be released so easily that opening of the arresting element can be accomplished in a simple manner.

The West German Pat. No. 31 27 553 mentioned earlier discloses a servomechanism which allows the arresting element to be mechanically moved between its release and arrest positions and is capable of fixing the arresting element in the arrest position. The servomechanism includes a fork-like element which embraces the periphery of the arresting element and, in the arrest position of the latter, is intended to define clearances with the arresting element so that this may rotate freely. However, if the biasing forces discussed previously, i.e., the forces due to the weight of the member received in the recess and urging the arresting element to the release position, were to act on the arresting element, the latter could be held in the arrest position only by abutting the fork-like element. In addition, the servomechanism requires a large amount of space and represents such a large expenditure that its use for the sole purpose of securing the arresting element in the arrest position is unwarranted. The servomechanism is, in fact, designed primarily for the purpose of mechanically opening and closing an arresting element.

The invention allows an arresting element to be held against movement to its release position without incurring the expense of a servomechanism such as above for this purpose. As a matter of fact, the invention may be usefully employed in combination with a servomechanism of this type. Thus, the arresting element may then be prevented from rubbing against the fork-like activating element or claw of the servomechanism as the arresting element rotates. Such rubbing results in undesired noise, heating and wear.

It is particularly advantageous for the pawl to be pivotally mounted on the arresting element. Here, the support may be provided with a cutout, and the pawl has an end portion which is received in the cutout in the operative position of the pawl and cooperates with the cutout to inhibit movement of the arresting element from its arrest position to its release position. The arresting element has an interior portion which confronts the support and rotates relative to the latter during pivoting of the arresting element between its release and arrest positions, and the pawl and cutout may be arranged so that the pawl projects from the interior portion of the arresting element into the cutout in the operative position. Mounting of the pawl on the arresting element facilitates operation of the pawl.

The pawl may be provided with an art which is constructed like a handle and serves to pivot the pawl from the operative to the inoperative position. The arm preferably has a gripping portion remote from the pivot axis of the pawl. This construction permits the pawl to be released in a very simple fashion when the arresting element is to be moved from its arrest position. Once the pawl has been moved to its inoperative position, the arresting element is pivoted to the release position in a conventional manner.

The pawl may be urged to its operative position by a biasing element which preferably takes the form of a resilient element such as a spring. Movement of the pawl to the inoperative position may then take place against the action of the biasing element. Advantageously, the biasing element is a tension spring which engages the arm of the pawl and resists pivoting of the latter to the inoperative position.

By employing an appropriate design, the pawl may be held in its operative position without the use of a spring. However, reliability is increased when the pawl is urged to the operative position via a spring.

The arresting element may be disposed in a predetermined plane. The pawl and its arm may be inclined with respect to one another and arranged in such a manner that, in the operative position of the pawl, the arm is located within the outline, and at least approximately in the plane, of the arresting element while the pawl extends at least approximately along the direction of movement of the arresting element during pivoting of the latter to its release position. This arrangement is particularly advantageous as regards operation of the coupling as well as operation of the arresting element and the pawl. During rotation of the coupling, the arm is then so oriented that centrifugal force acts on the arm in a sense which causes an additional component of force to be exerted on the pawl in a direction urging the pawl to its operative position. Operational reliability may thus be maintained even if the force of the biasing element or spring acting on the pawl is reduced.

The pawl and its arm may define an obtuse angle. This makes it possible to insure that the pawl will project from the arresting element into the cooperating cutout of the support whenever the arm lies in the plane of the arresting element.

For improved operation and force transmission, it is of advantage for the pawl and the cutout to be spaced from the recess in the support, as considered radially of the rotational axis of the support, and for the pawl to be mounted in the region of that portion of the arresting element which undergoes maximum pivotal movement during displacement of the arresting element between its release and arrest positions. Since this portion of the arresting element must be readily accessible in order to pivot the arresting element, mounting of the pawl in the region of such portion permits operation of the pawl to be improved. Furthermore, mounting of the pawl in the region of that portion of the arresting element which undergoes maximum displacement during pivoting of the arresting element makes it possible for the pawl to inhibit movement of the arresting element under relatively favorable conditions of moment or torque.

A coupling including one or more of the features described above enables the arresting element to be securely held in the arrest position even when a very heavy member is mounted in the recess of the support and subjects the arresting element to substantial forces urging the arresting element to its release position. This is accomplished without the need for a bulky device having a fork-like element or claw which embraces the periphery of the arresting element and comes into frictional engagement with the latter as soon as the arresting element deflects slightly. Moreover, operation of the coupling is simple and the manufacturing cost is increased insignificantly, if at all, relative to a conventional coupling in which the arresting element is located in the arrest position by means of a ball. Thus, in a coupling having such a ball, the arresting element and support must have appropriate provisions for the ball just as the arresting element and support of the invention must have suitable provisions for the pawl.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 2 is an end view of the coupling as seen in the direction of the arrow II of FIG. 1.

DESCRIPTION OF THE PREFERRED EMBODIMENTS

Figure 1:
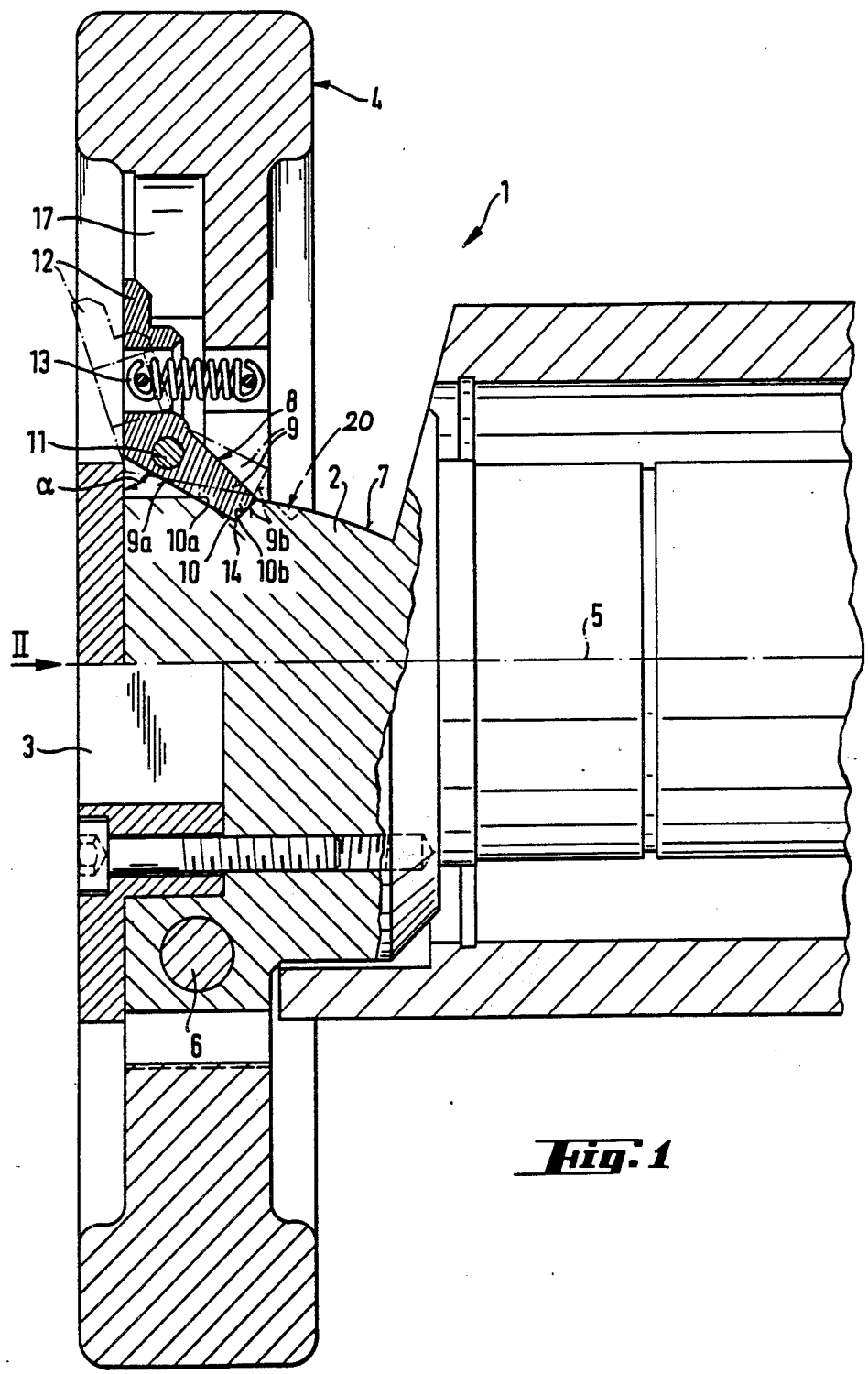
FIG. 1 is a fragmentary longitudinal sectional view of a coupling according to the invention as seen in the direction of the arrows I—I of FIG. 2.

Referring to FIGS. 1 and 2, the reference numeral 1 generally identifies a coupling for rotatably connecting a pair of rotary members. The coupling 1 includes a support 2 which is here assumed to be fast with a rotary member in the form of a rotary drive shaft. In the showing of FIG. 1, the righthand side of the support 2 is fast with the drive shaft. The support 2 is provided with a recess 3 which is designed to receive a complementary portion of a second rotary member to be rotatably connected with the drive shaft. The second rotary member may be a reel or spool for taking up and paying out lengths of material, and the complementary portion of the second rotary member may then be a stub shaft which is fixed to the reel and projects laterally thereof. The second rotary member could also be in the form of a second rotary shaft and, in such an event, the complementary portion of the second rotary member may be constituted by an appropriately journal at the end of the second rotary shaft. Although the second rotary member is not shown in the drawings, the complementary portion thereof is illustrated in FIG. 2 by phantom lines. The support 2 is designed to prevent relative rotation of the rotary members and to rotate together with the latter on an axis 5.

The coupling 1 further includes an arresting element in the form of a wheel 4 rotatable with the support 2. The arresting wheel 4 is pivotally mounted on the support 2 by means of a pivot pin 6 which extends at right angles to the rotational axis 5. With reference to FIG. 1, the arresting wheel 4 is pivotable between the illustrated arrest position and a release position 7.

The upper side of the recess 3 as seen in FIGS. 1 and 2 is open. In the release position 7 of the arresting wheel 4, the open side of the recess 3 is exposed so that the second rotary member may be inserted in or removed from the recess 3. On the other hand, the arresting wheel 4 overlies the open side of the recess 3 in the arrest position thereby preventing removal of the second rotary member from the recess 3.

The coupling 1 additionally includes locking means for locking the arresting wheel 4 against movement from the arrest position to the release position 7. The locking means functions to prevent unintentional or undesired opening of the arresting wheel 4, that is, unintentional or undesired pivoting of the arresting wheel 4 from the arrest position to the release position 7.

In the illustrated embodiment, the locking means comprises a bar-like element in the form of a pawl 8. The pawl 8 is pivotally mounted on the arresting wheel 4 by means of a pivot pin 11 which is parallel to the pivot pin 6 of the arresting wheel 4. The pivot pin 11 is accommodated in a passage 15 formed in the arresting wheel 4.

As may be seen from FIG. 1, the arresting wheel 4 has an internal portion which confronts the support 2 and rotates relative to the latter during pivoting of the arresting wheel 4 between its arrest position and its release position 7. The pawl 8 is mounted in the region of this internal portion. The surface of the support 2 which faces the pawl 8 and the internal portion of the arresting wheel 4 is provided with a cutout 10.

With reference still to FIG. 1, the pawl 8 is pivotable between an operative position indicated by full lines and an inoperative position indicated by phantom lines. The pawl 8 has an end portion 9 and, in the arrest position of the arresting wheel 4 and the operative position of the pawl 8, the pawl 8 projects from the internal portion of the arresting wheel 4 so that the end portion 9 is received in the cutout 10. Thus, in its operative position, the pawl 8 bridges the arresting wheel 4 and the support 2. The end portion 9 and the cutout 10 cooperate to inhibit movement of the arresting wheel 4 from the arrest position to the release position 7. On the other hand, in the inoperative position of the pawl 8, the arresting wheel 4 is free to move from its arrest position to its release position 7.

The pawl 8 is provided with an arm 12 which constitutes a handle for pivoting the pawl 8 from the operative to the inoperative position. The arm 12 has an end portion of reduced cross section remote from the pivot pin 11 of the pawl 8, and this end portion constitutes a gripping portion which may be gripped by an operator in order to move the pawl 8 from its operative to its inoperative position. The position of the arm 12 in the operative position of the pawl 8 is indicated by full lines in FIG. 1 while the position of the arm 12 in the inoperative position of the pawl 8 is indicated by phantom lines. In the showing of FIG. 1, movement of the arm 12 to the left from the full line position results in counterclockwise rotation of the pawl 8 on the pivot pin 11 which, in turn, causes the end portion 9 of the pawl 8 to leave the cutout 10.

Pivoting of the pawl 8 from the operative to the inoperative position occurs against the action of a bising element in the form of a spring 13 which urges the pawl 8 to its operative position. In the illustrated embodiment, the spring 13 is a tension spring which acts on the arm 12 so as to oppose movement of the latter in a sense releasing the pawl 8. FIG. 1 shows that the spring 13 is stretched when the arm 12 is pivoted in a direction to effect release of the pawl 8.

In the inoperative position of the pawl 8, the arm 12 may protrude from the arresting wheel 4 as illustrated in FIG. 1. It is of advantage, however, for the arm 12 to be disposed within the outline, and at least approximately in the plane, of the arresting wheel 4 in the operative position of the pawl 8. Similarly to conventional arresting wheels, the arresting wheel 4 then remains virtually free of protuberances despite the presence of the pawl 8. This helps to avoid accidents. Furthermore, when the arm 12 is located within the outline, and at least approximately in the plane, of the arresting wheel 4, a centrifugal force opposing unintentional or undesired pivoting of the pawl 8 to the inoperative position acts on the arm 12 during rotation of the arresting wheel 4 on the axis 5. This increases the reliability of the entire coupling 1.

The pawl 8 is inclined with reference to the arm 12 and defines an obtuse angle therewith. Thus, in the operative position of the pawl 8, the latter extends at least approximately along the direction of movement of the arresting wheel 4 during pivoting of the arresting wheel 4 between the arrest position and the release position 7. The cutout 10 is located upstream of the release position 7 as considered in the direction of the arrest position of the release position 7.

The pawl 8 is mounted in the region of that portion of the arresting wheel 4 which undergoes the maximum amount of pivotal movement during displacement of the arresting wheel 4 between its arrest position and its release position 7. Moreover, as shown in FIG. 2, the pawl 8 is spaced from the recess 3 of the support 2 as considered radially of the rotational axis 5. The cutout 10 in the support 2 is likewise spaced from the recess 3 as considered radially of the axis 5. If necessary, a second pawl or some other locking mechanism may be disposed mirror symmetrically with respect to the pawl 8.

The arresting wheel 4 is provided with an opening 17 in the region of the free end portion, i.e., the gripping portion, of the arm 12. The opening 17 facilites detection and gripping of the gripping portion. In addition, the opening 17 makes it possible to compensate for the imbalance of the arresting wheel 4 which arises due to the presence of the pawl 8. This may be accomplished by appropriate selection of the dimensions of the opening 17.

In the illustrated embodiment, and as shown in FIG. 1, the cutout 10 has an angular cross section and is bounded by a pair of planar surfaces 10a and 10b which are disposed in intersecting planes. Similarly, the pawl 8 has two planar faces 9a and 9b disposed in intersecting planes. The face 9a constitutes a bottom face of the pawl 8 in the showing of FIG. 1 while the face 9b constitutes an end face of the pawl 8. In the operative position of the pawl 8, the bottom face 9a of the pawl 8 contacts the surface 10a of the cutout 10 whereas the end face 9b of the pawl 8 contacts the surface 10b of the cutout 10. The contour of the cutout 10 matches the outer contour of the end portion 9 of the pawl 8, i.e., the coutout 10 is complementary to the end portion 9, and the latter accurately mates with the cutout 10. The bottom face 9a of the pawl 8 and the surface 10a of the cutout 10 constitute cooperating abutments which determine the precise operative position of the pawl 8. On the other hand, actual transmission of forces occurs via the end face 9b of the pawl 8 and the surface 10b of the cutout 10.

The angle between the two boundary surfaces 10a, 10b of the cutout 10, as well as the angle between the bottom face 9a and the end face 9b of the pawl 8, is greater than 90°. This prevents the pawl 8 from catching in the cutout 10 when the pawl 8 is pivoted from its operative to its inoperative position and, in particular, prevents the end face 9b of the pawl 8 from becoming hung up on the boundary surface 10b of the cutout 10.

The surfaces 10a, 10b of the cutout 10 intersect to define a corner which, in the showing of FIG. 1, is located in the lower portion of the cutout 10. Similarly, the faces 9a, 9b of the pawl 8 intersect to define a corner 14 which mates with the corner of the cutout 10 in the operative position of the pawl 8. The angle between the faces 9a, 9b of the pawl 8, and likewise the angle between the boundary surfaces 10a, 10b of the cutout 10, is selected in such a manner that, upon pivoting of the pawl 8 out of the cutout 10, the corner 14 of the pawl 8 moves progressively farther away from the opposing surface 10b of the cutout 10. This facilitates movement of the pawl 8 out of the operative position and, by the same token, facilitates movement of the pawl 8 into this position. The angle between the faces 9a, 9b of the pawl 8 and between the boundary surfaces 10a, 10b of the cutout 10 may, for example, be of the order of 100°.

In the illustrated embodiment, the bottom face 9a of the pawl 8, which trails the pawl 8 during movement of the latter from the operative to the inoperative position, defines an angle alpha of the order of 60° with the plane of the arresting wheel 4 in the operative position of the pawl 8. This allows the pivot pin 11 for the pawl 8 to be disposed relatively near the support 2 and the pawl 8 to project into the cutout 10 to a sufficient depth while nevertheless permitting the arm 12 of the pawl 8 to be conveniently arranged.

As seen in FIG. 2, the recess 3 is designed to receive a polygonal complementary portion, i.e., a polygonal stub shaft or journal, of a rotary member to be mounted on the support 2. The cross-sectional configuration of the complementary portion is such that the latter has diagonals, and is preferably square. The lower portion of the recess 3 in the showing of FIG. 2 is bounded by a pair of planar surfaces located in intersecting planes, and these surfaces intersect at the deepest point of the recess 3 to define a corner. In the illustration of FIG. 2, the surfaces bounding the lower portion of the recess 3 are normal to one another. The recess 3 accommodates the complementary portion of a rotary member in such a manner that a diagonal of the complementary portion extends in a direction at right angles to the pivot pin 6 of the arresting wheel 4. Accordingly, when the coupling 1 is rotated 180° clockwise or counterclockwise from the position of FIG. 2, a corner of the complementary portion is brought to bear against the portion 16 of the arresting wheel 4 which closes the open side of the recess 3 in the arrest position of the arresting wheel 4. The arresting wheel 4 is then subjected to considerable forces, particularly when the rotary member mounted in the recess 3 is very heavy. The complementary portion of the rotary member may bend slightly under the weight of the rotary member and this, in turn, may generate a component of force urging the arresting wheel 4 to its release position. However, the pawl 8 prevents unintentional or undesired opening of the arresting wheel 4 under the action of such a force component.

As shown by dashed lines in FIG. 1, the support 2 may be provided with a second cutout 20 which is disposed along the path of pivotal movement of the arresting wheel 4 and is located downstream of the cutout 10 as considered in a direction from the arrest position to the release position 7 of the arresting wheel 4. The cutout 20 is designed to receive the end portion 9 of the pawl 8 when the arresting wheel 4 is pivoted somewhat from the arrest position towards the release position 7. In the inclined position assumed by the arresting wheel 4 when the pawl 8 is received by the cutout 20, the open side of the recess 3 is partially blocked and the arresting wheel 4 still prevents insertion of a rotary member in, and removal of a rotary member from, the recess 3. Accordingly, this inclined position constitutes a second arrest position of the arresting wheel 4. When the arresting wheel 4 is in the second arrest position and the pawl 8 assumes the corresponding operative position in which the end portion 9 thereof projects into the second cutout 20, the end portion 9 and the second cutout 20 cooperate to inhibit movement of the arresting wheel 4 towards its release position 7. The second cutout 20 makes it possible to hold the arresting wheel 4 in an auxiliary arrest position when the primary arrest position illustrated in FIG. 1 cannot be achieved due to dirt build-up, wear or the like so that the pawl 8 is unable to enter the primary cutout 10. Thus, in the event that the arresting wheel 4 cannot be moved into its primary arrest position, the second cutout 20 allows the arresting wheel 4 to reliably assume an auxiliary position in which the recess 3 is closed to an extent sufficient to prevent release of a rotary member mounted therein. The second cutout 20 permits the operational reliability of the coupling 1 to be increased significantly. This is particularly true when the coupling 1 is designed in such a manner that the arresting wheel 4 tends to close automatically when it begins to rotate on the axis 5 and, for some reason, is unable to pivot all the way to its primary arrest position. The auxiliary locking stage corresponding to the second cutout 20, which insures that the arresting wheel 4 closes the recess 3 sufficiently to secure a rotary member even though the arresting wheel 4 is not fully closed, accordingly provides an additional margin of safety.

The configuration of the second cutout 20 may be largely the same as, or identical to, that of the primary cutout 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for rotatably connecting a pair of rotary members, particularly for rotatably connecting a drive shaft with a spool, comprising a support designed to hold the members against relative rotation and to rotate with the latter, said support being provided with a recess designed to receive a complementary portion of one of the members; an arresting element rotatable with said support and movable between a release position in which the complementary portion is insertable in and removable from said recess, and an arrest position in which removal of the complemetary portion from said recess is inhibited; and locking means for locking said arresting element against movement from said arrest position to said release position, said locking means including a bar-like element movable between an inoperative position, and an operative position in which said bar-like element bridges said support and said arresting element to thereby lock said arresting element against movement from said arrest position to said release position.

2. The coupling of claim 1, wherein said arresting element is pivotable between said release and arrest positions about an axis transverse to the axis of rotation of said support.

3. The coupling of claim 1, wherein said bar-like element is a pawl.

4. The coupling of claim 1, wherein said bar-like element is pivotally mounted on said arresting element for movement between said operative and inoperative positions.

5. The coupling of claim 4, said support having a cutout; and wherein said bar-like element has an end portion which is received in said cutout in said operative position and cooperates with said cutout to inhibit movement of said arresting element from said arrest position to said release position.

6. The coupling of claim 1, wherein said bar-like element is provided with an arm constituting a handle for moving said bar-like element from said operative position.

7. The coupling of claim 6, said bar-like element being pivotable between said operative and inoperative positions about a predetermined axis; and wherein said arm has a gripping portion remote from said predetermined axis.

8. The coupling of claim 1, comprising a biasing element which urges said bar-like element to said operative position.

9. The coupling of claim 8, wherein said biasing element is a spring.

10. The coupling of claim 8, said bar-like element being provided with an arm constituting a handle for moving said bar-like element from said operative position; and wherein said biasing element acts on said arm.

11. The coupling of claim 10, wherein said biasing element is a tension spring.

12. The coupling of claim 1, said bar-like element being provided with an arm constituting a handle for moving said bar-like element from said operative position; and wherein said arm is located within said arresting element in said operative position.

13. The coupling of claim 12, said arresting element being pivotable between said release and arrest positions and being displaceable along a predetermined direction upon movement from said arrest position to said release position; and wherein said bar-like element is inclined with respect to said arm and extends at least approximately along said predetermined direction in said operative position.

14. The coupling of claim 12, said arresting element being disposed in a predetermined plane in said arrest position; and wherein said arm is located in said predetermined plane in said operative position.

15. The coupling of claim 1, said bar-like element being provided with an arm constituting a handle for moving said bar-like element from said operative position; and wherein said arm and said bar-like element define an obtuse angle.

16. The coupling of claim 1, said arresting element being pivotable between said release and arrest positions about a preselected axis; and wherein said bar-like element is mounted on said arresting element in a region of the latter which is remote from said preselected axis.

17. The coupling of claim 16, wherein said bar-like element is spaced from said recess.

18. The coupling of claim 17, said support being provided with a cutout, and said bar-like element having an end portion which is received in said cutout in said operative position and cooperates with said cutout to inhibit movement of said arresting element from said arrest position to said release position; and wherein said cutout is spaced from said recess.

19. The coupling of claim 1, said bar-like element being provided with an arm constituting a handle for moving said bar-like element from said operative position; and wherein said arm is disposed within said arresting element in said operative position and said arresting element is provided with an opening for gripping said arm.

20. The coupling of claim 1, said bar-like element having an end portion provided with an end face and another face, and said faces being disposed in intersecting planes; and wherein said support is provided with a cutout which receives said end portion in said operative position and cooperates with said end portion to inhibit movement of said arresting element from said arrest position to said release position, said cutout having a pair of surfaces disposed in intersecting planes, and one of said surfaces contacting said end face in said operative position, the other of said surfaces contacting said other face in said operative position.

21. The coupling of claim 20, wherein said end portion is complementary to said cutout.

22. The coupling of claim 20, wherein the angle between the intersecting planes of said faces and the angle between the intersecting planes of said surfaces respectively exceed 90°.

23. The coupling of claim 20, said bar-like element being pivotable between said operative and inoperative positions; and wherein said faces intersect to define a corner of said end portion, the angle between said faces being such that said corner progressively moves away from said one surface as said bar-like element pivots from said operative to said inoperative position.

24. The coupling of claim 1, said arresting element being pivotable between said release and arrest positions about a preselected axis; and wherein said bar-like element is pivotable between said operative and inoperative positions about an axis substantially paralleling said preselected axis.

25. The coupling of claim 1, said arresting element being pivotable between said release and arrest positions about a preselected axis; and wherein said recess is designed to receive a polygonal complementary portion having a diagonal, said recess being provided with a pair of surfaces which are disposed in intersecting planes and arranged such that the diagonal of a complementary portion accommodated by said recess extends at substantially right angles to said preselected axis.

26. The coupling of claim 25, wherein said planes are substantially normal to one another.

27. The coupling of claim 1, said arresting element being disposed in a predetermined plane; and wherein said bar-like element is pivotable between said operative and inoperative positions, said bar-like element having a face which trails said bar-like element during movement from said operative to said inoperative position, and said face defining an angle of approximately 60° with said predetermined plane in said operative position.

28. The coupling of claim 1, said bar-like element having an end portion provided with an end face and another face located in intersecting planes, and said faces contacting respective surfaces of said support in said operative position; and wherein said planes define an angle of approximately 100°.

29. The coupling of claim 1, said support having a cutout, and said bar-like element having an end portion which is received in said cutout in said operative position and cooperates with said cutout to inhibit movement of said arresting element from said arrest position to said release position; and wherein said arresting element has a second arrest position in which removal of the complementary portion from said recess is inhibited, said bar-like element having a second operative position, and said support being provided with a second cutout arranged to receive said end portion in said second operative position and to cooperate with said end portion so as to inhibit movement of said arresting element from said second arrest position to said release position.

30. The coupling of claim 29, said arresting element being pivotable between said release position and said arrest positions along a predetermined arc; and wherein said cutouts are spaced as considered in a direction along said arc.

* * * * *